United States Patent [19]

Williams

[11] Patent Number: 5,022,317
[45] Date of Patent: Jun. 11, 1991

[54] FODDER CONDITIONING PROCESS

[76] Inventor: Kenneth J. Williams, 12 W. McCabe Rd., El Centro, Calif. 92243

[21] Appl. No.: 481,043

[22] Filed: Feb. 16, 1990

Related U.S. Application Data

[63] Continuation-in-part of Ser. No. 440,796, Nov. 24, 1989.

[51] Int. Cl.⁵ .................................................. B30B 13/00
[52] U.S. Cl. ........................................ 100/35; 100/38; 100/71; 100/74; 100/91; 100/92; 209/2; 209/10; 209/34; 366/348; 426/636
[58] Field of Search ................ 100/35, 38, 71, 73, 100/74, 90, 91, 92; 209/2, 10, 34, 136, 307; 426/636; 366/348

[56] References Cited

U.S. PATENT DOCUMENTS

| | | | |
|---|---|---|---|
| 1,005,392 | 10/1911 | Wilson et al. | 426/636 |
| 1,688,524 | 10/1928 | Cobb | 100/73 X |
| 2,487,162 | 11/1949 | Meyer et al. | 100/92 X |
| 2,949,362 | 8/1960 | Branom | 100/38 |
| 3,010,576 | 11/1961 | Harte et al. | 209/10 X |
| 3,353,947 | 11/1967 | Kramer | 100/91 X |
| 4,475,562 | 10/1984 | Thatcher et al. | 209/136 X |
| 4,624,129 | 11/1986 | Haynes . | |

FOREIGN PATENT DOCUMENTS 1239 of 1869 United Kingdom .................. 100/38

Primary Examiner—Philip R. Coe
Assistant Examiner—Stephen F. Gerrity
Attorney, Agent, or Firm—Henri J. A. Charmasson

[57] ABSTRACT

A process for conditioning and compacting vegetable fodder prior to storage and shipment which comprises breaking standard-sized bales and adjusting the moisture level of the fodder to reduce pulverization during subsequent compacting and handling; while at the same time injecting mold inhibitors and nutritional additive before repackaging the fodder into more compact bales, cubes or pellets for shipment.

11 Claims, 3 Drawing Sheets

FODDER CONDITIONING PROCESS

PRIOR APPLICATION

This Application is a Continuation-in-part of copending application Ser. No. 07/440,796 filed Nov. 24, 1989.

BACKGROUND OF THE INVENTION

This invention relates to the packing, storage and shipping of fodder and more specifically hay.

Hay and other forage fodder is often packed and stored for long periods for use during the winter season, or may need to be shipped to remote locations. For instance, alfalfa and other types of hay grown in the United States is commonly packed and shipped overseas to countries with limited land resources such as Japan. Storage and shipping costs require that the hay be compacted into high density bales of convenient size and weight. Typically, a standard 220 kilogram (100 pounds) bale is compacted to reduce its length by half. The compacted bale can be broken down by the user into bite-size morsels that limit spillage and tramping when they are pulled through the manger. The storage or shipping of compacted fodder which retains an excessive level of moisture leads to the development of molds and spoiling fermentation. Fodder may even carry vermin or germs and even botulinus which may develop to a level harmful and even deadly to the animal. Compacting under great pressure of certain categories of hay in a dry state leads to a shattering of the leaf structures and general pulverization of the product. This pulverization results in great losses during transport and subsequent handling. Rock and dirt particles collected during the harvesting of fodder can also affect the quality and commerciality of the product It is practically impossible to control the moisture level of a stack of baled hay. This moisture level can vary greatly from bale to bale depending upon the weather conditions at the time the hay in each bale was harvested, the location of the bale within the haystack and its exposure to sun, wind, rain and other environmental hazards. Accordingly, when bales of hay are broken down and repackaged in bulk into compacted units for shipment, the condition and quality of the fodder upon arrival at a point of use is subject to unpredictable variations.

There is need for a process for conditioning the fodder before its shipping or storage for long periods.

SUMMARY OF THE INVENTION

The principal and secondary objects of this invention are to provide a process for regulating and even improving the condition of forage fodder before it is packaged and stored or shipped for long periods, to prevent pulverization of the fodder which may result from its compacting into more convenient and economical form than the conventional bales, and to recover nutritious leafy particles of fodder which have separated from the stems.

These and other objects are achieved by breaking up the standard sized bales of vegetable fodders which are produced by harvesting machines, pasteurizing the fodder, sifting out the rock and dirt particles and adjusting the moisture level to reduce pulverization during compacting and storage; while at the same time injecting mold retardant and other beneficial additives before repackaging the fodder into more compact bales for storage and shipping cost effectiveness and handling convenience.

DESCRIPTION OF THE PREFERRED EMBODIMENTS OF THE INVENTION

Figure 1:
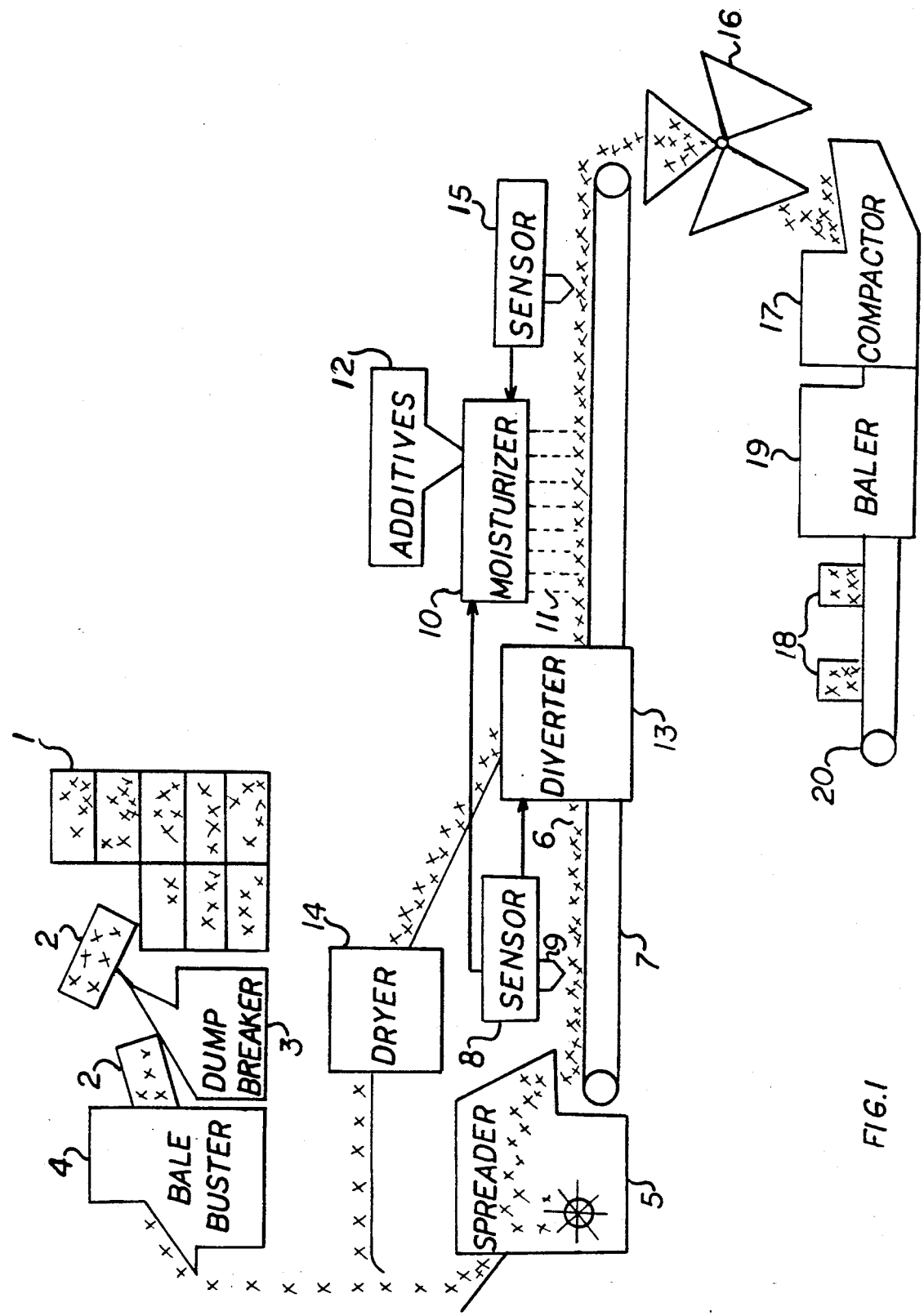
FIG. 1 is a diagram of a first process for the conditioning and packaging of fodder.

Referring now to the drawing, there is shown in FIG. 1 an illustrative diagram of the claimed process in which a typical dump 1 of bales of hay is broken up into individual bales 2 by a dump breaker 3. The bales are then broken up by a bale-buster 4. The loose hay is stirred by an agitator or spreader 5 which dumps it in a generally density-wise homogeneous mat 6 carried by a belt-conveyor 7. A moisture sensor 8 having a probe 9 in contact with the traveling mat 6 of hay monitors the moisture content. A moisturizer 10 adds a water solution to the mat as a function of the level of moisture measured by the sensor 8. This moisturizer 10 may be in the form of a steam injector or a liquid sprayer. The aqueous solution 11 which is injected into or sprayed over the mat of hay 6 may contain several additives. First, a mold retardant or inhibiting compounds such as sodium bicarbonate, urea, propranic acid, or any other edible preservative. The second additive may be an hormonal or other beneficial nutrient or a vitamin supplement. These additives may be premixed in a separate hopper 12 for mixing with the aqueous solution. A diverter 13 located between the moisture sensor 8 and the moisturizer 10 re-route any hay whose moisture level exceeds a given maximum limit toward a dryer 14 from which is then carried back toward the agitator 5. The diverter 13 may be implemented by means of a diverting barrier which falls across the conveyor belt as a function of the moisture sensor output. The dryer 14 is preferably of the cold vacuum-type, although any other drying process might be used. Thus, that part of the fodder which was found to an excessive level of moisture is run through the dryer as many times as it might be necessary to bring the level of moisture just below the desirable one as detected by the sensor 8. At which point it is allowed to proceed through the moisturizer 10 which will add the exact amount of moisture necessary as well as some other additives to meet the optimum predetermined level. A second moisture sensor 15 is used to monitor the final moisture level of the mat 6 as it exits the moisturizer station. The output of that sensor is fed back to the moisturizer to further refine its operation. The hay is then separated into batches of equal weight by a weight separator 16 which accumulates a predetermined weight of hay of the conveyor 7, then dumps each batch separately into the compactor 17. In the compactor 17, the batches of hay are pressed into a series of high density bales 18 which are secured by a banding machine 17.

It has been found that hay that retains a certain level of moisture will not be shattered by the compacting process, even in the case of the most fragile alfalfa-type with small leaves and sturdier stems. The compacted bales 18 are carried by a second conveyor 20 to a container or truck for shipment.

Figures 2, 3:
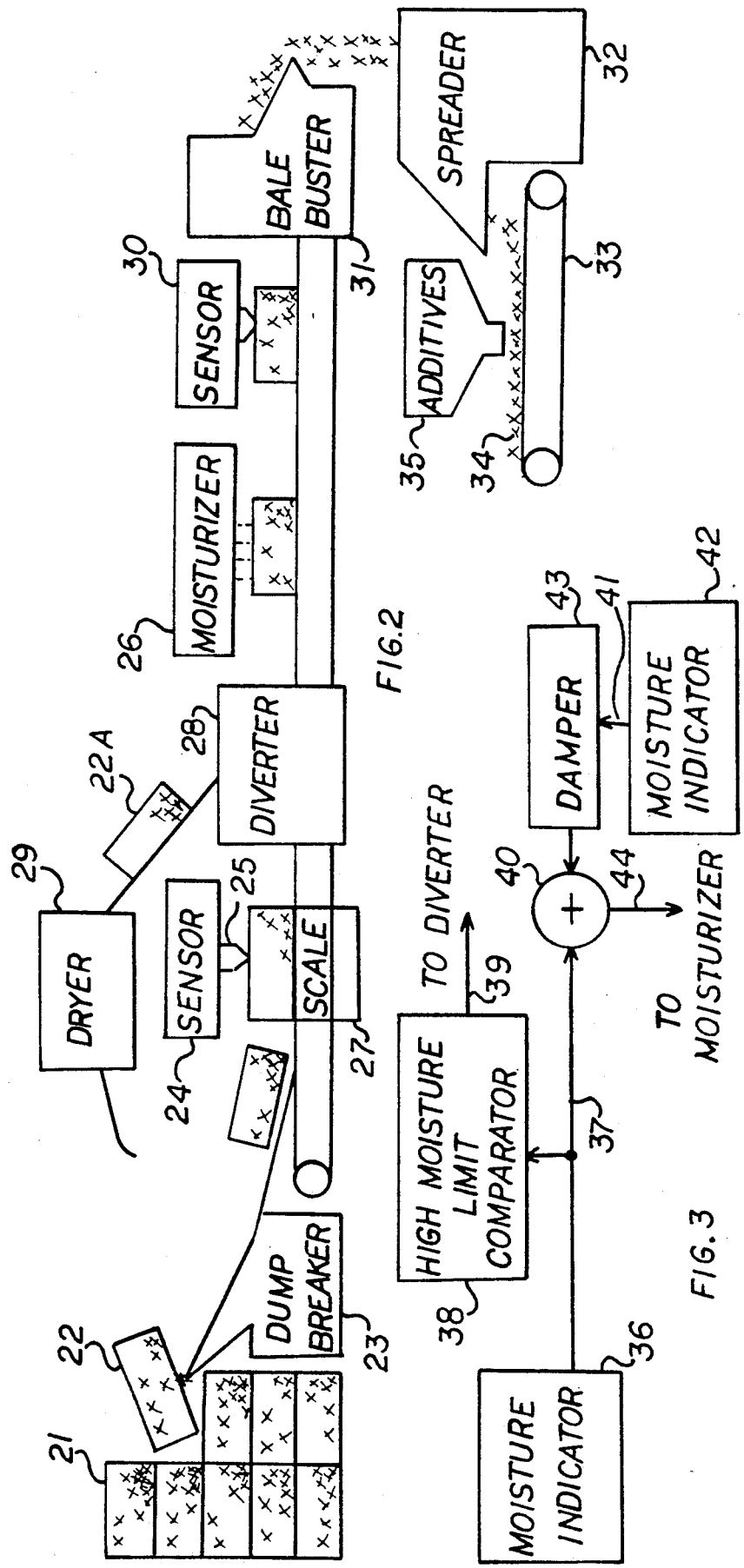
FIG. 2 is a diagram of an alternate embodiment of the claimed process.
FIG. 3 is a block diagram of the moisturizer control system.

The alternate process illustrated in FIG. 2 begins as before with the breaking of a dump 21 into bales 22 by a dump breaker 23. However, the bales are not busted open, but processed whole through a first moisture sensor 24 having probes 25 before being subject to a moisturizer 26. Each bale is weighed by a scale 27, and its weight is used in determining the exact amount of moisture that must be injected or sprayed upon it by the moisturizer 26. Between those two units, bales 22A which are found to contain an excessive level of moisture are sent via a diverter 28 to a dryer 29 before being dumped back just ahead of the first moisture sensor 24. A second moisture sensor 30 monitors the moisture level of the bales as they come out of the moisturizer, and the output from the moisture sensor is used to further refine the operation of the moisturizer. The bales are then busted open by the bale buster 31 and their contents spread as an homogeneous mat 34 by the spreader 32 over another conveyor 33. The conveyor runs past an additive sprayer 35 before feeding a weight-separator. After that point the process follows the same sequence as in the first embodiment. The weight-separator loads a compactor which creates the final compacted bales which are banded by a banding unit 38, then carried by a conveyor 9 to a shipping container.

FIG. 3 illustrates the control system of the moisturizer's in either of the two processes A first moisture indicator 36 which may be part of the sensor 8 of the first embodiment or the sensor 24 of the second embodiment yields a moisture level reading 37 which is fed into a high moisture limit comparator 38. When the high moisture level is exceeded the comparator issues a switching signal 34 to the diverter The moisture signal 37 is also sent to a moisturizer control circuit 40 where it is combined with a second moisture level signal 41 issued by a second moisture indicator 42 which is part of the second sensor 15 of the first embodiment or the second sensor 30 of the second embodiment. The second moisture readout is electronically delayed by a damper circuit 43 so that it causes only a long term correction of the moisturizer activity. The combined signals 44 are then fed to the control input of the moisturizer.

The level of moisture which is desirable in hay that is going to be subjected to the compactor lies between 12 and 25 percent of weight. Given the control resolution which may be expected from the moisturizer, the high moisture limit above which the incoming hay will be diverted to a dryer may be set somewhere between 13% and 20%. The above moisture levels are particularly indicated for alfalfa. It should be understood that they may be adjusted according to the leafy quality of the hay and the compacting force of the compactor and the type and dosage of added preservative. In the preferred embodiments the compactor pressure is adjusted to create bales having generally twice the density of standard bales produced by current harvesting machinery.

Figure 4:
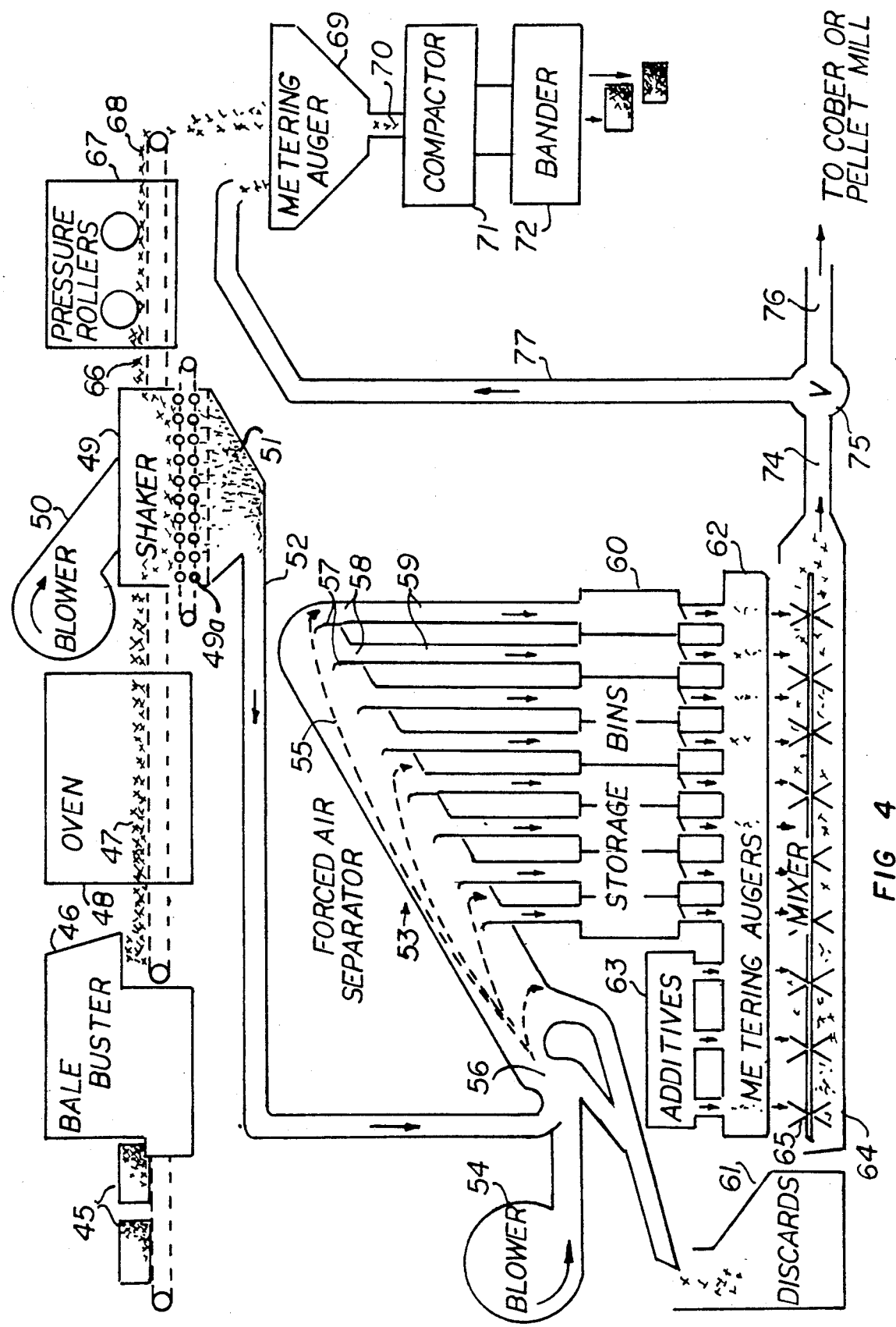
FIG. 4 is a block diagram of a supplemental process for reconditioning fodder.

The supplemental processes illustrated in FIG. 4 are particularly indicated for reconditioning of fodder which either may have reached an excessive level of dryness leading to separation of nutritious leaves from their sprigs, or fodder that needs to be rid of rock and dirt particles which may have been picked up during the harvest. The reconditioning processes also provide for ridding the fodder of vermin and harmful germs.

These processes may be used separately or together, and independently or in conjunction with the conditioning processes previously described.

Bales 45 of harvested hay are first broken up by a bale buster 46 as in the previously described processes. The loose hay 47 is passed through an oven 48 where it is exposed to temperatures above 120 degrees Celsius (250 degrees F.) for a minimum of ten minutes. It is believed that this treatment will kill vermin, parasites and all types of botulinus.

The next process is the sifting out of all loose particles; not only the rock and dirt particles which have been picked up by the harvesting machine, but also all the leafy material which we may have been separated from the main stems and sprigs of the fodder. This is accomplished in a shaker 49 in which chains 49a are run or oscillated through a bed of fodder under the draft created by a blower 50, the sifted and blown loose particles 51 are collected and carried by a duct 52 to a forced-air separator 53. The separating process consists in blowing the loose small particles in an obliquely vertical direction with the help of an additional blower 54. Loose particles 55 of the lightest density are blown farther away from the blowing orifice 56 than the heaviest rock and dirt particles Baffles 57 interposed through the length of the separator 53 separates the flying loose particles according to their respective densities. Chutes 58 and ducts 59 are provided to carry the various grades and densities of separated particles into distinct storage bins 60. The heaviest particles, namely rocks and dirt are collected at the bottom of the separator and stored in a separate discard bin 61.

It can be now understood that the storage bins 60 contain various grades of forage particles from very nutritious light leafy debris to less nutritious but yet consumable bits of stems and other more woody parts of the forage. These various distinct types of material are combined according to predetermined requirements in a mixer 62. The various specific quantities of each types of material are metered by a gang of augers which can be programmed to drop specific quantities of the desired materials. Various types of metering augers particularly indicated for this type of material, such as the one disclosed in Haynes U.S. Pat. No. 4,624,129, are well known to the art. Additives 63 such as nutrients or preservatives are also added to the mixture 64. The mixture is stirred by an agitator 65 before being carried to various usages.

The remainder of the forage 66 coming out of the shaker 49, and which consists of the sprigs and stem-like components of the forage are passed through pressure rollers 67 to reduce their volume. The resulting mat 68 of remaining fodder is then divided into separate batches by another metering auger 69. Each batch 70 is compacted and shaped into bales by a compactor 71 as in the previously described processes. A bander 72 ties the compacted bales 73 prior to shipment.

The mixture 64 carried from the mixers 62 through duct 74 are directed by multi-port valve 75 toward the metering auger 69 for recombination with the remainder of the original fodder through duct 76 or directed to a cuber or pellet mill for incorporation in these various types of feeds through duct 77.

It should be noted that depending on the intensity of the shaking and sifting out process of the shaker 49 the percentage of the nutritious components of the fodder which are sifted out and sent to the forced-air separator 53 can be varied. In the extreme case all the nutritious elements could be removed and processed through the separator, leaving only straw-like or woody residue 66 to be used for other purposes than feed. In a different application the shaker 49 could be used to simply remove the heavy rock and dirt particles and the dust to be discarded, letting the loose leaves and all nutritious components of the fodder remain with the sprig-like components.

While the preferred embodiments of the invention have been described, modifications can be made thereto and other embodiments may be devised without departing from the spirit of the invention and the scope of the appended claims.

What is claimed is:

1. A process for conditioning fodder for storage and shipment which comprises the steps of:
   pasteurizing said fodder;
   sifting out loose small particles from sprig-like elements of said pasteurized fodder;
   separating said loose particles into separate batched according to their respective densities including grouping into a heavy batch, particles having a density at least equal to the density of dry dirt;
   discarding said heavy batch;
   combining some of the remaining batches with said sprig-like elements; and
   packing said combination into compact bales.

2. The process of claim 1, wherein the step of pasteurizing comprises heating said fodder to a temperature of 120 degrees Celsius for at least ten minutes.

3. The process of claim 1, wherein said step of combining comprises making a mixture of specific percentages of a plurality of said remaining batches according to their respective densities.

4. The process of claim 3, wherein the step of separating comprises:
   blowing said sifted loose small particles in a generally horizontal direction; and
   gathering said blown particles in separate batched according to their distance of ballistic travel.

5. The process of claim 4, wherein the step of sifting comprises shaking said pasteurized fodder under a draft of forced air.

6. The process of claim 5, wherein the step of shaking comprises running a plurality of chains through said pasteurized fodder.

7. The process of claim 4, wherein the step of making a mixture comprises dispensing metered quantities of a plurality of types of said remaining batches into a mixing device.

8. The process of claim 4 which further comprises the step of adding preservatives to said mixture.

9. The process of claim 4 which further comprises the step of pressing said sprig-like elements before combination with said mixture.

10. The process of claim 4, wherein the step of packaging comprises compressing metered quantities of combined mixture and sprig-like elements into bales.

11. The process of claim 4 which further comprises adding nutrients to said mixture.

* * * * *